(12) United States Patent
Hutchin (10) Patent No.: US 8,415,600 B2
(45) Date of Patent: Apr. 9, 2013

(54) LASER BEAM CONTROL SYSTEM AND METHOD

(75) Inventor: Richard A. Hutchin, Calabasas, CA (US)

(73) Assignee: Optical Physics Company, Calabasas, CA (US)

( * ) Notice: Subject to any disclaimer, the term of this patent is extended or adjusted under 35 U.S.C. 154(b) by 323 days.

(21) Appl. No.: 12/412,547

(22) Filed: Mar. 27, 2009

(65) Prior Publication Data

US 2011/0103410 A1    May 5, 2011

(51) Int. Cl.
*G01B 11/26* (2006.01)
*G01S 13/86* (2006.01)
(52) U.S. Cl. ............... 250/201.9; 250/203.1; 250/203.2
(58) Field of Classification Search ............... 250/201.9, 250/203.1, 203.2; 356/521, 451, 452
See application file for complete search history.

(56) References Cited

U.S. PATENT DOCUMENTS

| 6,809,307 | B2 * | 10/2004 | Byren et al. | ............... 250/201.9 |
| 6,872,960 | B2 * | 3/2005 | Pepper et al. | ............... 250/495.1 |

* cited by examiner

*Primary Examiner* — Tony Ko
(74) *Attorney, Agent, or Firm* — Novak Druce Connolly Bove + Quigg LLP (57) ABSTRACT

A laser beam control system includes an output aperture through which a laser beam is directed toward a target. A laser beam return is also received through the output aperture, with the laser beam return including scatter from the laser beam. A deformable mirror is adapted to control the outgoing laser beam, and a sensor is adapted to detect the wavefront of the laser beam return. An optics controller is operationally coupled to the deformable mirror and is adapted to adjust the deformable mirror in response to the wavefront of the laser beam return.

45 Claims, 4 Drawing Sheets

LASER BEAM CONTROL SYSTEM AND METHOD

BACKGROUND OF THE INVENTION

1. Field of the Invention

The field of the present invention is laser beam control systems, particularly systems that both control direction of the laser beam and provide wavefront correction.

2. Background

Laser beam control systems have many disparate applications, such as directed energy weapons, both lethal and non-lethal, LIDAR and beacons, countermeasures, remote chemical sensing, target illumination, and micromachining. Among these applications, the high energy laser (HEL) beam control systems are used mainly in directed energy weapons. Beam control in HEL systems is rendered more challenging since such systems are often required to direct the HEL to a target across large distances, thus requiring adaptive optics to correct for atmospheric turbulence and aerosol effects.

Current HEL beam control systems generally have high power optical trains containing more than a dozen mirrors. Having so many components in the optical train adds to the size, weight, and complexity of the control system. However, as the need for mobile deployment of directed energy weapons increases, the beam control systems necessarily need to be reduced in size, weight, and complexity, without sacrificing sophistication.

HEL beam control systems typically use two illuminators, one to track the hard body of the target (called the "target illuminator") and the other for wavefront sensing (called the "beacon illuminator"). The target illuminator is usually a broader beam, and it is usually directed to a large portion of the target, or sometimes the entire target, to track features of the target, locate and select an aimpoint on the target, and maintain a stable line of sight to the target. The beacon illuminator is a beam directed toward the aimpoint, or alternatively ahead of the aimpoint to correct for distances and target velocity. The beacon illuminator is usually a beam at a wavelength different from the HEL in order to enable distinguishing the two beams. The return from the beacon illuminator is sent to an adaptive optics system to measure the wavefront error resulting from the flow field and atmospheric turbulence between the HEL source and the target. Such two illuminator systems, while functional, are costly, heavy, and complex.

HEL beam control systems have also been traditionally blind. In existing systems, the target is tracked using a different wavelength than the HEL beam and the internal alignment system is used to infer the HEL boresight relative to the target without any measurements of the actual HEL beam position on the target. Simply put, this arrangement slows down and potentially decreases precision of targeting.

SUMMARY OF THE INVENTION

The present invention is directed toward a laser beam control system and method. A target tracking system, which is described as part of the laser beam control system, but which may be constructed as a stand-alone module, is also disclosed. In the laser beam control system, a laser beam is directed through an output aperture toward a target. The system includes at least one of a deformable mirror and a steering mirror. Each of these mirrors may be used to control the outgoing laser beam.

In a first separate aspect of the claimed subject matter, a laser beam return, which includes scatter from the laser beam, is received through the output aperture and detected by a sensor. An optics controller is operationally coupled to the deformable mirror and is adapted to adjust the deformable mirror in response to a wavefront of the laser beam return detected by the sensor. The scatter may result from the laser beam incident upon the target, or it may result from the laser beam passing through a medium between the output aperture and the target. As another possibility, the scatter may be from both of the aforementioned scatter sources, such that the deformable mirror is adjusted in response to a comparison between the wavefronts of the two scatter sources. A second sensor may also be included to detect a wavefront of the laser beam before it is directed through the output aperture. With this second sensor, the optics controller may be further adapted to adjust the deformable mirror in response to the wavefronts detected by both sensors. Additional scatter control elements may also be included along the optical path leading from the source of the laser beam to the output aperture.

In a second separate aspect of the claimed subject matter, a laser beam return, which includes scatter from the laser beam, is received through the output aperture and detected by a sensor. An optics controller is adapted steer the laser beam by controlling an angular position of the steering mirror based upon a relative position of the laser beam return on the sensor. Optionally, the deformable mirror may also function as a steering mirror, such that the optics controller controls the angular position of the deformable mirror. The scatter may result from the laser beam passing through a medium between the output aperture and the target. In addition, a target illuminator may be included and adapted to direct a target illuminator beam toward a target, such that a target illuminator beam return is generated by scatter of the target illuminator beam off the target. The target illuminator beam return may also be received through the output aperture. With this optional configuration, the optics controller may be adapted to steer the laser beam based upon relative positions on the sensor of images generated by the laser beam return and the target illuminator return.

In a third separate aspect of the claimed subject matter, a target tracking system is implemented as a component for the laser tracking system. The target tracking system includes a dispersive element, a sensor, and an optics controller. The dispersive element is optically coupled to an input aperture, which receives a first laser beam return and a second laser beam return, the two laser beam returns being at different wavelengths. The sensor is optically coupled to the dispersive element, such that the dispersive element images the laser beam returns onto the sensor, both laser beam returns generating images on first and second areas of the sensor, respectively. The optics controller is operationally coupled to the sensor and is adapted to determine a relative spatial relationship between the first and second laser beam returns based upon relative positions of the respective images generated on the sensor. As part of determining the relative spatial relationship, the optics controller may generate a virtual image of the second image in the first area of the sensor, such that relative positions of the virtual image and the first image, both within the first area of the sensor, indicates the relative spatial relationship. A steering mirror may be operationally coupled to the optics controller, with the optics controller being adapted to control the angular position of the steering mirror based upon the determined relative spatial relationship.

In a fourth separate aspect of the claimed subject matter, the laser beam is directed along an optical path between a laser source and the output aperture. The optical path is defined by at least a steering mirror, a deformable mirror which also performs as both a fast steering mirror and as a primary mirror, a secondary mirror, a first quarter-wave plate which also functions as a polarizer, and a second quarter-wave plate which edges and cores the laser beam and also functions as a polarizer. An optics controller and a sensor may also be included as part of the system. As one option, the sensor may be adapted to detect a wavefront of a laser beam return received through the output aperture, in which case the optics controller is adapted to adjust the deformable mirror in response to the detected wavelength. As another option, the relative position of the laser beam return on the sensor may be detected, in which case the optics controller is adapted to control the angular position of at least one of the deformable mirror and the steering mirror. A target illuminator directing a target illuminator beam at a target may also be included in the laser beam control system. The target illuminator beam scatters off the target and generates a target illuminator beam return, which is received through the output aperture. The target illuminator beam return may be detected by the sensor and used by the optics controller, along with the laser beam return, to steer the laser beam.

In a fifth separate aspect of the claimed subject matter, the method of controlling the laser beam includes directing the laser beam along an optical path through the output aperture and toward a target using at least one of a steering mirror and a deformable mirror. A laser beam return, which includes scatter from the laser beam, is detected, and the detected beam is used to adjust at least one of the steering mirror and the deformable mirror. The scatter may be generated by the laser beam incident upon the target, or it may be generated as the laser beam passes through the medium between the target and the output aperture. Scatter from the two different sources may be differentiated using speckle statistics. As an option, the wavefront of the laser beam return may be detected, in which case the deformable mirror is adjusted in response to the detected wavefront. As another option, a relative position of the laser beam return is detected on a sensor, and the angular position of at least one of the steering mirror and the deformable mirror is adjusted in response to the detected relative position.

In a sixth separate aspect of the claimed subject matter, any of the foregoing aspects, including any optional features, may be employed in combination.

Accordingly, an improved laser beam control system and method are disclosed. Advantages of the improvements will appear from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
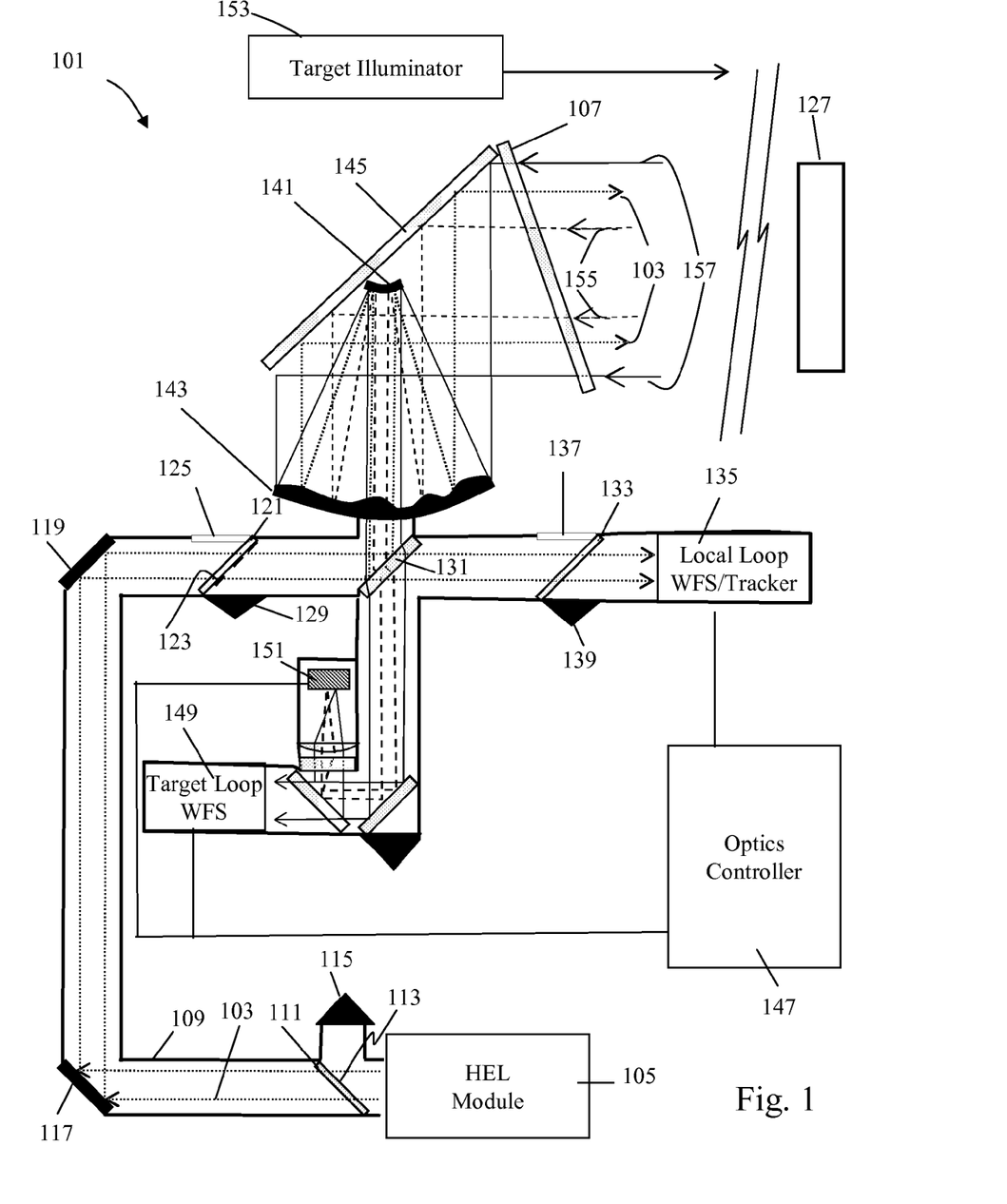
FIG. 1 schematically illustrates a first laser beam control system.

Turning in detail to the drawings, FIG. 1 illustrates a laser beam control system 101 adapted to control a High Energy Laser (HEL) beam 103 emitted by the HEL module 105. The HEL beam 103 is directed along an optical path by a series of optical components and out through the output aperture window 107. Although more or fewer optical components may be included as part of the laser beam control system 101, those shown are selected to provide the additional advantage of a compact, lightweight, and simplified design for the laser beam control system as compared to such systems known in the prior art.

In the design as shown, many of the components are selected to serve multiple functions to condition and direct the HEL beam 103. The beam path is surrounded by walls 109 to contain the HEL beam 103 and minimize stray light that may damage or blind surrounding systems. The HEL module 105 is of a standard type known in the prior art, and when the HEL beam 103 emerges from the HEL module 105, the HEL beam 103 is predominantly of a single linear polarization. Optical scatter of the HEL beam 103 along the beam path is significantly reduced by polarization control, starting with the polarization of the HEL beam 103 emitted from the HEL module 105. Any number of other optical components may be included along the beam path to achieve additional scatter control.

The first optical component in the beam path is a quarter-wave plate 111, the leading surface of which is coated to form a polarizing beam splitter 113. This polarizing beam splitter 113 serves to clean up the polarization of the HEL beam 103 by circularizing its polarization. A beam dump 113 disposes of any untransmitted light reflected off the polarizing beam splitter 113.

The circularly polarized HEL beam 103 travels through an azimuth-elevation type Coude path in which it is reflected by two steering mirrors 117, 119. These two steering mirrors 117, 119 together aid in controlling beam walk, direction, and/or jitter errors in a manner which is well known to those of skill in the relevant arts. The still circularly polarized HEL beam 103 is then directed through another ¼ wave plate 121, the trailing surface of which is coated to form a polarizing beam splitter 123 and to include a reflective pattern for beam scrapping and coring. Such beam control techniques are well known to those of skill in the art. The polarizing beam splitter 123 changes the polarization of the HEL beam 103 back to linear and also removes any small amount of cross polarization that may remain in the HEL beam 103 at this point of the optical path.

The excess beam power with the wrong polarization, as well as the beam power removed by the coring and edging, are dumped to the exterior of the laser beam control system 101 through a window 125 in the direction toward the target 127. The excess beam power may be dumped with divergence to enhance safety to surrounding people or equipment. By defocusing this power, even the excess power from an HEL beam rapidly becomes non-lethal as it travels toward the target, thereby reducing or eliminating damage non-targets. Also, if the wavelength of the HEL beam is selected appropriately, such as in the 1.5-1.6 micron range, the diverging excess beam power will be eye safe as soon as it has expanded to a few square meters. This can be made to happen within 100 meters of the window 125. As an alternative to the window 125, the excess power may be reflected into an appropriate beam dump. A beam dump 129 is included adjacent the leading edge of the ¼ wave plate 121 so that excess power returning down the beam path may be reflected into the beam dump 129 by the ¼ wave plate 121.

The two ¼ wave plates 111, 121 may be constructed from any suitable material. When the system is used to control an HEL beam, sapphire is a suitable choice because it has low absorption in the 1-2 micron wavelength range as well as high thermal conductivity, which aids in minimizing aberrations caused by heating from the HEL beam.

After passing through the second ¼ wave plate 121, the HEL beam 103 is highly linearly polarized. It is then substantially reflected by the aperture sharing element (ASE) 131, which is a polarizing beam splitter at the HEL beam wavelength. A small amount of the HEL beam power (e.g., less than about 0.1%) transmits through the ASE 131, through a polarizing beam splitter (PBS) 133 to the local loop wavefront sensor and tracker subsystem 135. Again, beam power not transmitted through the PBS 133 is dumped through a window 137 toward the target with divergence for safety. The excess power may alternatively be reflected into a beam dump. Finally, another beam dump 139 disposes of light reflected off the wavefront sensor and tracker subsystem 135 and off the backside of the PBS 133.

The main part of the HEL beam 103 continues along the optical path and is reflected by the secondary mirror 141 toward the deformable mirror 143. The deformable mirror 143 also serves as the primary mirror and as the fast steering mirror. The deformable mirror 143 is preferably of the type disclosed in U.S. patent application Ser. No. 12/368,626, filed Feb. 10, 2009, the disclosure of which is incorporated herein by reference in its entirety. In serving as the fast steering mirror, the actuators of the deformable mirror are used to make small adjustments to the direction of the HEL beam. From the deformable mirror 143, the HEL beam is reflected by the coarse steering mirror 145 and directed outward through the output aperture window 107.

Depending upon design and application considerations, the deformable mirror may be replaced by a primary mirror having a fixed surface. In this case, the deformable mirror is positioned elsewhere in the beam path, e.g., between the ASE 131 and the secondary mirror 141.

The local loop wavefront sensor and tracker subsystem 135 provides closed loop correction for the HEL beam 103 wavefront and tilt by sensing the wavefront of the outgoing HEL beam 103 and tracking its line of sight. This subsystem 135 may be part of an adaptive optics system for correcting wavefront errors in the HEL beam 103 which originate at the HEL module 105 and those errors which might occur along the optical path between the HEL module 105 and the subsystem 135. The local loop wavefront error may be measured using a modern shearing interferometer which has virtually perfect linearity, although other types of wavefront sensors may also be employed. By using an interferometer with such accuracy, the local loop wavefront error may be combined with the target loop wavefront error (discussed in further detail below) in a servo controller to obtain accurate end-to-end wavefront control with the single deformable mirror.

An optics controller 147 is electronically connected to various parts of the beam control system 101 to control each of the controllable components, i.e., the steering mirrors in the Coude path, the deformable mirror, the coarse steering mirror, and any other steering and/or controllable mirrors which might be included in the system. As depicted, the optics controller 147 is a separate component from the wavefront sensor and tracker subsystem 135, the target loop wavefront sensor 149, and the target loop hit spot tracker 151 (described in greater detail below). These various feedback and control components may be part of a single, integrated electronics package, along with the optics controller 147, or they may be divided into any number of discrete subsystems based upon design preference.

During use, besides broadband background light, three main sources of laser light are incident upon the output aperture window 107. The first source is scatter in the form of a target illuminator beam return 155. The target illuminator 153 is another laser source operating at a wavelength different from the wavelength of the HEL beam 103 and at a significantly lower power. The target illuminator 153 generates a target illuminator beam, which is directed at the target 127. The target illuminator 153 essentially the same as those used in the prior art. It is typically a broad beam, and it is usually directed to a large portion of the target, or sometimes to the entire target, to track features of the target, locate and select an aimpoint on the target, and maintain a stable line of sight to the target. The target illuminator beam is incident upon the target, thereby generating scatter and the target illuminator beam return 155.

The second and third sources of light both result from scatter of the HEL beam 103. These two sources are incident upon the output aperture 107 in the form of a single HEL beam return 157, which is the sum of scatter of the HEL beam 103 off the target 127 and from the medium existing between the output aperture 107 and the target 127. However, if the HEL beam 103 is not on target, there will be no scatter off the target. Given the common source, the HEL beam return 157 is thus substantially of the same wavelength as the HEL beam 103. The specific medium discussed herein is the atmosphere, although the medium can be nearly anything depending upon application and design considerations. Further, within the atmosphere, scatter may be caused by molecules, aerosols, and any other particles present. Although both of the second and third sources of light entering the output aperture window 107 are subject to atmospheric turbulence and any flow field that may persist in the vicinity around the laser beam control system 101, only scatter off the target 127 is subject to the entire field between the laser beam control system 101 and the target 127. Further, when the HEL beam 103 is on target, signals generated by the superimposed scatter are distinguished by the target loop wavefront sensor 149 so that scatter off the target may be used to correct certain wavefront errors, e.g., focus, in the outgoing HEL beam 103.

The scatter from particles in the medium through which the HEL beam is directed is unexpectedly bright, and it can be observed through scatter generated by the local optical system. For example, scatter bidirectional reflectance distribution functions (BRDF's) from high quality HEL mirrors run on the order of about $10^{-7}$/steradian. Atmospheric aerosols typically backscatter about 5%-30% of HEL light over $4\pi$ steradians, thus resulting in an effective BRDF of about 0.004-0.024/steradian, which is more than $10^4$ times brighter than the optic scatter off the primary mirror or a window surface. A detailed scatter analysis considering all parts in the optical path of the HEL beam from the HEL module 105 to the output aperture window 107 shows 1,000 to 50,000 times more aerosol scatter than optic scatter in a well-designed optical system. Another unexpected discovery is that the HEL beam scatter from the atmosphere has an extremely bright and small core of about $2\lambda/D$ in diameter, where $\lambda$ is the HEL beam wavelength and D is the HEL beam transmit diameter, and this core can be easily and accurately tracked. This bright core exists because viewing directions close to the center of the scatter beam have a long scatter path, with the scatter beam getting brighter and brighter as the HEL beam focuses on the target.

Figure 2:
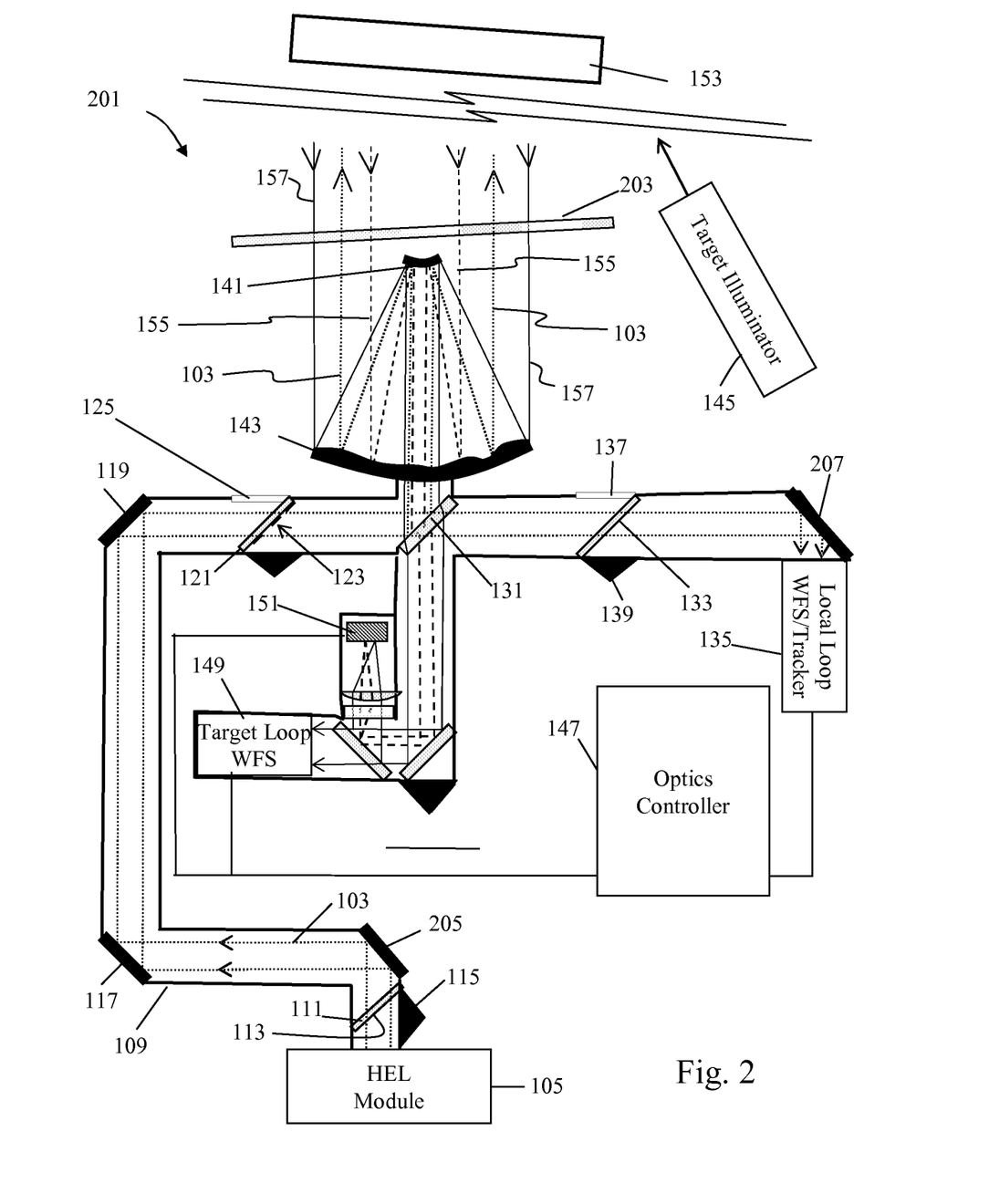
FIG. 2 schematically illustrates a second laser beam control system.

FIG. 2 illustrates a second laser control system 201 having many of the same features as described for the system depicted in FIG. 1, although with a slightly different configuration. This laser control system 201, however, lacks a coarse steering mirror. Instead, the HEL beam 103 is directed through the output aperture window 203 by the deformable mirror 143. The secondary mirror 141 in this system may include tilt and translation capabilities so that it can perform the function of the absent coarse steering mirror over a modest field of regard. Further, the output aperture window 203 is also a ¼ wave plate. Such an output aperture window 203 aids in enhancing detection of the aerosol and target scatter by the sensors 149, 151 and may provide advantages for some applications. The Coude path includes a third steering mirror 205 to aid in construction of a more compact gimbaling configuration. Likewise, a mirror 207 is included between the local loop wavefront sensor 135 and the PBS 133 to aid in constructing a system that is more compact.

In laser beam control systems such as those described above, the HEL beam return 157 and the target illuminator beam return 155 enter through the output aperture window 107 and are detected to enhance the functionality of the system. With reference to the laser beam control system 101 of FIG. 1, both beam returns 155, 157 reflect off the coarse steering mirror 145, the deformable mirror 143, and the secondary mirror 141 and pass through the ASE 131. With reference to the laser beam control system 201 of FIG. 2, both beam returns 155, 157 reflect off the deformable mirror 143 and the secondary mirror 141 and pass through the ASE 131.

Figure 3A:
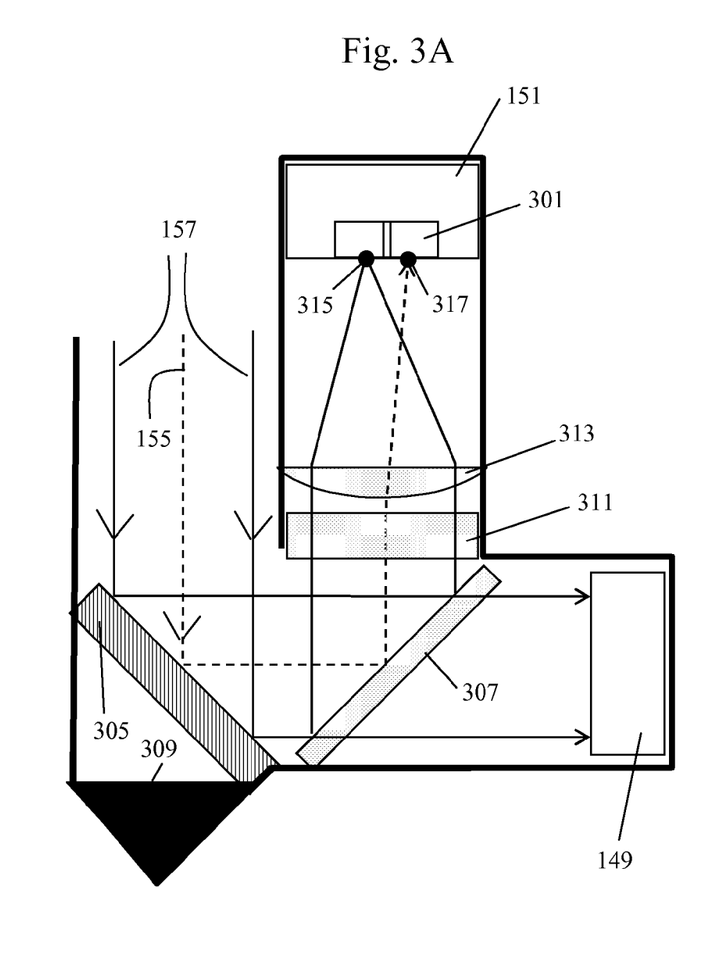
FIG. 3A schematically illustrates a detailed view of the beam return optical path within the laser beam control system of both FIGS. 1 & 2.

FIG. 3A shows a detailed view of the beam return processing optics and sensors. The HEL beam return 157 is directed toward both a tracking sensor 301, which is part of the target loop hit spot tracker 151, and a target loop wavefront sensor 149, while the target illuminator beam return 155 is directed only toward the tracking sensor 301. A polarizing beam splitter 305, which protects the tracking sensor 301 and the target loop wavefront sensor 149 from stray HEL light that happens to leak through, reflects the HEL beam return 157 toward a dichroic beam splitter 307, which splits the HEL beam return 157 into two beam parts. The amount of power included in each beam part may be determined based upon design considerations, however, having about a 4:1 power split between the beam part that is directed towards the target loop wavefront sensor 149 and the beam part that is directed towards the target loop hit spot tracker 151, respectively, has been found sufficient to perform the wavefront sensing and target tracking functions described below. Any beam power which passes through the polarizing beam splitter 305 is directed into a beam dump 309. The first beam part is directed toward the tracking sensor 301 through a dispersive element 311 and a focusing lens 313. Since the two return beams 155, 157 have different wavelengths, the dispersive element 311 creates a predetermined offset between two images 315, 317 on the tracking sensor 301. The second beam part is directed toward the target loop wavefront sensor 149. The target illuminator beam return 155 is also directed by the polarizing beam splitter 305 toward the dichroic beam splitter 307, but the target illuminator beam return 147 is substantially, if not entirely, reflected by the dichroic beam splitter 307 and toward the tracking sensor 301.

Figure 3B:
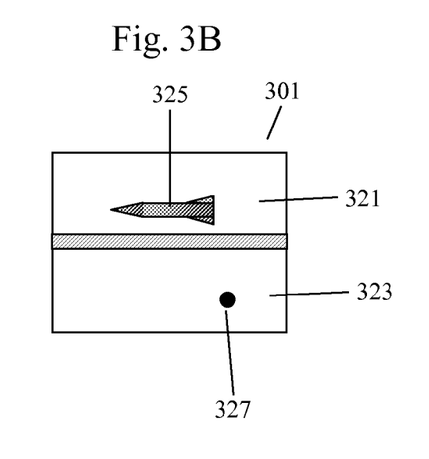
FIG. 3B schematically illustrates target and hit spot imaging on the sensor of the target loop hit spot tracker.
Figure 3C:
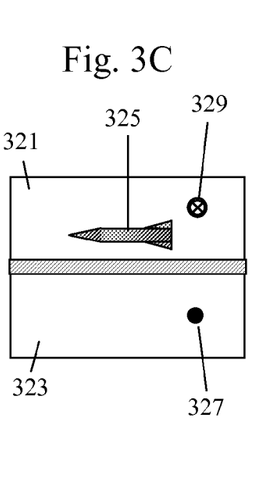
FIGS. 3C and 3D schematically illustrate alignment of the laser boresight using target and hit spot imaging on the sensor.
Figure 3D:
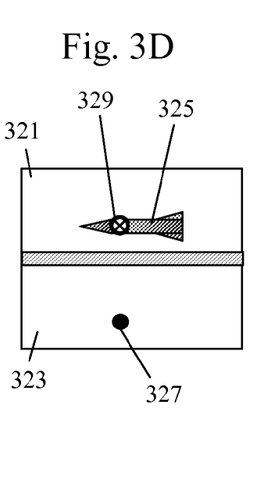

As is shown in FIG. 3B, the tracking sensor 301 is divided into two zones 321, 323. This division may be formed in any manner, with the simplest being identification of one or more rows of light sensing elements within the tracking sensor 301 as the dividing line between the two zones 321, 323. The target illuminator beam return 155 creates a target image 325 within the first zone 321, and the HEL beam return 157 is focused onto the second zone 323, thereby generating an image 327 of the HEL beam return 157 within the second zone 323. With this design and through appropriate calibration, the relative position of the target image 325 in the first zone 321 to the focal spot 327 in the second zone 323 provides very accurate information as to the relative direction of the outgoing HEL beam with respect to the position of the target. As shown in FIG. 3C, this known relationship may be used to generate a virtual image 329 of the focal spot 327 within the first zone 321. When the virtual image 329 does not overlap with the target image 325 in the first zone 321, the outgoing HEL beam is off target. As shown in FIG. 3D, the virtual image 329 overlaps with the target image 325 in the first zone 321 as the boresight of the outgoing HEL beam is adjusted and the HEL beam is actually on target. With this target loop hit spot tracker 151, it is anticipated that the position of the focal spot 327 with respect to the target image 325 can be determined to about $0.05 \lambda/D$, where $\lambda$ is the HEL wavelength and D is the diameter of the outgoing HEL beam.

Not only can the target loop hit spot tracker 151 be used to track the HEL beam with respect to the target, but it can also be used to detect the hit spot on the target and to image the hit spot on the target. By imaging the hit spot on the target, the quality of the HEL hit spot can be evaluated and used as a convenient and useful real-time diagnostic.

The target loop wavefront sensor 149 may employ nearly any wavefront sensor known in the art. Such well-known wavefront sensors include the Shack-Hartmann wavefront sensor and the lateral shearing interferometer wavefront sensor. Regardless of which type of wavefront sensor is employed, the signal generated by the wavefront sensor may be processed to separate the target return, which is the portion of the signal generated from the HEL beam scattered off the target, from the medium return, which is that portion of the signal generated from scattering of the HEL beam in the medium. Again, this separation can be useful since the target return wavefront may be used for better correction of certain types of wavefront errors, as it passes through the entire medium between the laser beam control system and the target.

Separation of the target return from the medium return is achieved through application of speckle statistics. Speckle is the spatial intensity fluctuations in the scatter from a surface illuminated by a laser. When a laser scatters off any optically rough surface the return light has speckles. Speckle intensity off such a rough surface has an exponential probability distribution with a standard deviation, $\sigma$, approximately equal to the mean value, $\mu$, thereby resulting in large and rapid signal swings-typically in the range of 3-20 KHz for an HEL engagement. In contrast, intensity fluctuations in the signal resulting from backscatter off particles in the medium exhibit low frequency Gaussian statistics with a standard deviation, $\sigma$, much less than the mean, $\mu$. The high frequency behavior of the target beam return combined with the differences in the exponential probability distribution allows the signal resulting from the HEL beam scattered off the target to be isolated from the signal resulting from scatter of the HEL beam within the medium.

As a side note, for many tactical laser applications, the medium scatter signal also produces a rather good wavefront measurement with the exception of the focus mode of the beam. Using the medium scatter signal, the beam will focus at an average range closer than the actual target significantly reducing the flux intensity on target. By separating the target return scatter from the medium return scatter, the bias between the two wavefronts can be found, thereby allowing more precise correction of the beam focus.

Figure 4:
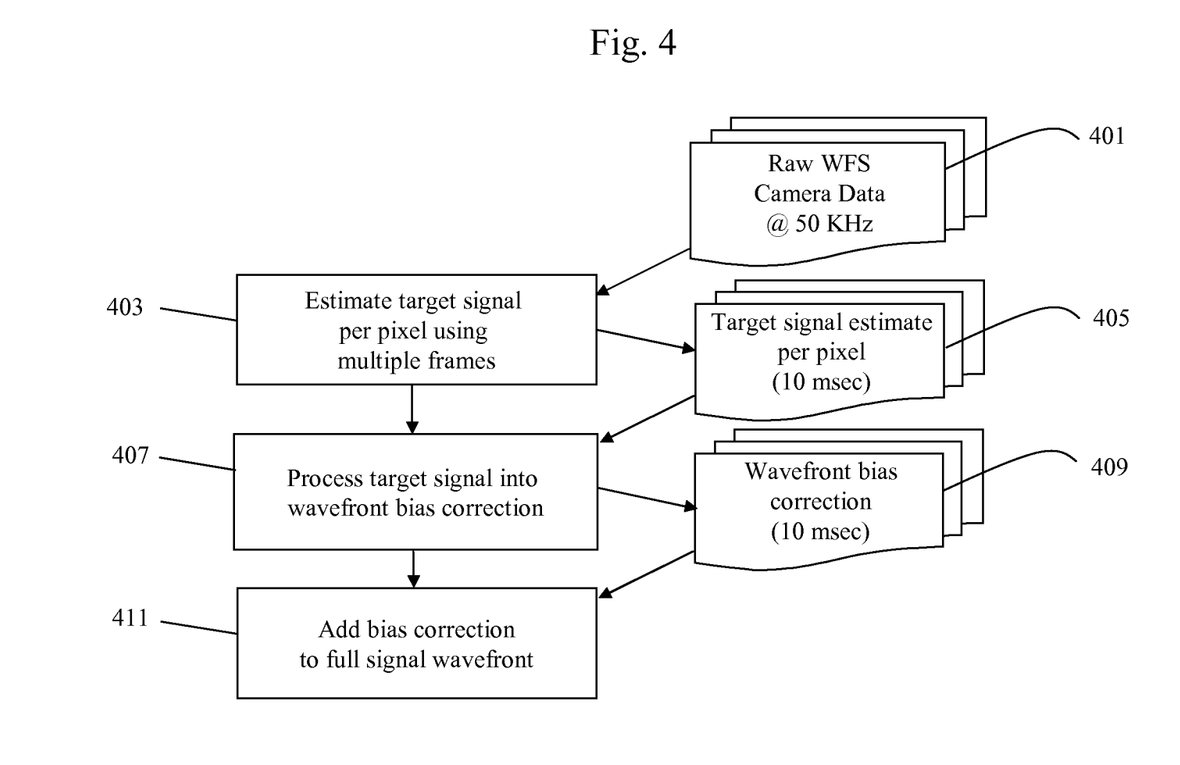
FIG. 4 is a flowchart illustrating processing of the beam return by the wavefront sensor.

FIG. 4 is a flowchart illustrating how the target loop wavefront sensor processes the signal generated by the incident HEL beam return. For this flowchart, it is assumed that the target loop wavefront sensor employs a Shack-Hartmann wavefront sensor (WFS) with a fast focal plane array (FPA) which reads out the intensity pattern at 50,000 frames per second. This read out rate is fast enough to freeze the speckle patterns in the HEL beam return from the target. To initiate the process, the combined HEL return beam signal 401 (i.e., the sum of target scatter and backscatter from the medium) is used to estimate a wavefront error 403. This initial estimate is sufficient to obtain good wavefront correction of the optic error and the boundary layer distortion in the target loop, but it may also have significant focus bias since the average range of scatter from particles in the medium is closer than the target.

Following this initial wavefront error estimate 403, a histogram is built from the signal levels for each pixel in each subaperture of the Shack-Hartman sensor over a nominal time period, such as 10 milliseconds. With a 10 millisecond time period, the histogram for each pixel contains five hundred values at the sampling rate of 50 KHz. This histogram is analyzed using speckle statistics to estimate 405 the exponential portion of each pixel (i.e., the contribution to each pixel due to the HEL beam return scatter from the target), which is then processed 407 to estimate the bias between the target scatter wavefront and the total scatter wavefront 409. This bias is updated about every 10 msec and added 411 to the high bandwidth wavefront errors using the combined returns from the target and medium. The frames of WFS data may be processed at a faster or slower rate as needed according to design and application considerations. For example, the WFS data may be processed at a rate of once every 0.2-1 msec, with the bias correction still being estimated once about every 10 msec.

Even though the speckle based processing technique described above assumes that a Shack-Hartman WFS is used, a shearing interferometer is preferred for practical implementation. This is because the shearing interferometer approach requires fewer pixels (e.g., only 3-4 pixels per subaperture per axis) as compared to the Shack-Hartmann approach. At a high frame rate, fewer pixels lead to a lower data acquisition bandwidth and processing load. By using a shearing interferometer, two 16×48 pixel arrays are capable of encoding the entire wavefront, and when the data is read out at 50,000 frames per second, the data rate is only $38 \times 10^6$ pixels/second for each array. This amount of data can be easily processed using currently available FPGA-based processors to yield 10 KHz wavefront data.

One additional benefit of speckle-based wavefront sensor data processing is that the angular bias due to the delay in the speed of light (point-ahead lag) present in the HEL beam backscatter from the medium can be directly and accurately measured by comparing the data from the scintillating target relative to the data from the relatively static medium. This bias gives the point-ahead correction needed for the end-to-end tracker. While this correction is usually small (e.g., 2 microradians for a target traveling at the speed of sound), it can provide a significant advantage to aid in keeping performance high. The speckle-based wavefront sensor data processing can measure this bias with less than 5% error by comparing the spatial centroid positions of the atmospheric aerosol scatter signal and the target speckle signal.

Thus, a laser beam control system and method are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A laser beam control system comprising:
an output aperture through which a laser beam is directed toward a target, and through which a laser beam return is received, the laser beam return including scatter from the laser beam;
a deformable mirror adapted to control the laser beam;
a first sensor adapted to detect a wavefront of the scatter from the laser beam in the laser beam return; and
an optics controller operationally coupled to the deformable mirror and adapted to adjust the deformable mirror in response to the wavefront,
wherein the scatter comprises a first scatter resulting from the laser beam incident upon the target superimposed on a second scatter resulting from the laser beam passing through a medium between the output aperture and the target.

2. The system of claim 1, wherein a signal generated by the first sensor is analyzed by the optics controller to differentiate between the first scatter and the second scatter.

3. The system of claim 2, wherein the optics controller uses speckle statistics to analyze the signal.

4. The system of claim 1, wherein the controller is adapted to adjust the deformable mirror in response to a comparison of a wavefront of the first scatter with a wavefront of the second scatter.

5. The system of claim 1, further comprising scatter control elements disposed along an optical path leading from a source of the laser beam to the output aperture.

6. The system of claim 1, wherein the deformable mirror performs as a primary mirror.

7. The system of claim 1, wherein the deformable mirror performs as a fast steering mirror.

8. A laser beam control system comprising:
an output aperture through which a laser beam is directed toward a target, and through which a laser beam return is received, the laser beam return including scatter from the laser beam;
a deformable mirror adapted to control the laser beam;
a first sensor adapted to detect a wavefront of the scatter from the laser beam in the laser beam return;
a second sensor adapted to detect a wavefront of the laser beam before the laser beam is directed through the output aperture; and
an optics controller operationally coupled to the deformable mirror and adapted to adjust the deformable mirror in response to the wavefront of the scatter.

9. The system of claim 8, wherein the optics controller is adapted to adjust the deformable mirror in response to the wavefronts detected by the first sensor and the second sensor.

10. A laser beam control system comprising:
an output aperture, comprising a quarter wave plate, through which a laser beam is directed toward a target, and through which a laser beam return is received, the laser beam return including scatter from the laser beam;
a deformable mirror adapted to control the laser beam;
a first sensor adapted to detect a wavefront of the scatter from the laser beam in the laser beam return; and
an optics controller operationally coupled to the deformable mirror and adapted to adjust the deformable mirror in response to the wavefront.

11. A laser beam control system comprising:
an output aperture through which a laser beam is directed toward a target, and through which a laser beam return is received, the laser beam return including scatter from the laser beam;
a target illuminator adapted to direct a target illuminator beam toward a target, wherein a target illuminator beam return is generated by scatter of the target illuminator beam off the target and is received through the output aperture;
a steering mirror adapted to direct the laser beam along an optical path toward the output aperture;
a sensor adapted to detect the scatter from the laser beam in the laser beam return; and
an optics controller adapted to steer the laser beam, based upon a relative position of the scatter from the laser beam in the laser beam return on the sensor, by controlling an angular position of the steering mirror.

12. The system of claim 11, wherein the target illuminator beam and the laser beam have different wavelengths.

13. The system of claim 11, further comprising a dispersive element adapted to image each of the laser beam return and the target illuminator beam return onto separate areas of the sensor.

14. The system of claim 13, wherein the optics controller is adapted to steer the laser beam based upon relative positions on the sensor of images generated by the laser beam return and the target illuminator beam return.

15. The system of claim 11, further comprising scatter control elements disposed along an optical path leading from a source of the laser beam to the output aperture.

16. A laser beam control system comprising:
an output aperture, comprising a quarter wave plate, through which a laser beam is directed toward a target, and through which a laser beam return is received, the laser beam return including scatter from the laser beam;
a steering mirror adapted to direct the laser beam along an optical path toward the output aperture;
a sensor adapted to detect the scatter from the laser beam in the laser beam return; and
an optics controller adapted to steer the laser beam, based upon a relative position of the scatter from the laser beam in the laser beam return on the sensor, by controlling an angular position of the steering mirror.

17. A target tracking system comprising:
a dispersive element optically coupled to an input aperture, wherein the input aperture receives a first laser beam return and a second laser beam return, the laser beam returns being at different wavelengths;
a sensor optically coupled to the dispersive element, wherein the dispersive element is adapted to image the laser beam returns onto the sensor, the first laser beam return generating a first image on a first area of the sensor, and the second laser beam return generating a second image on a second area of the sensor; and
an optics controller operationally coupled to the sensor and adapted to determine a relative spatial relationship between the first and second laser beam returns based upon relative positions of the images generated on the sensor.

18. The system of claim 17, further comprising a steering mirror operationally coupled to the optics controller, wherein the optics controller is adapted to control an angular position of the steering mirror in response to the determined relative spatial relationship.

19. The system of claim 17, wherein the optics controller is adapted to generate a virtual image of the second image in the first area of the sensor, such that relative positions of the virtual image and the first image in the first area of the sensor indicates the relative spatial relationship.

20. A laser beam control system comprising:
an output aperture through which a laser beam is directed outward toward a target, the laser beam being directed along an optical path between a laser source and the output aperture, wherein the optical path is defined by at least:
a steering mirror;
a deformable mirror adapted to perform as both a fast steering mirror and as a primary mirror;
a secondary mirror;
a first quarter-wave plate adapted to transmit a first selected polarization of the laser beam; and
a second quarter-wave plate adapted to edge and core and to transmit a second selected polarization of the laser beam.

21. The system of claim 20, further comprising:
a sensor adapted to detect a wavefront of a laser beam return received through the output aperture; and
an optics controller operationally coupled to the deformable mirror and adapted to adjust the deformable mirror in response to the wavefront detected by the sensor.

22. The system of claim 21, wherein a signal generated by the sensor resulting from detection of the wavefront is analyzed by the optics controller using speckle statistics.

23. The system of claim 20, further comprising:
a sensor adapted to detect a laser beam return received through the output aperture; and
an optics controller adapted to steer the laser beam, in response to a relative position of the laser beam return on the sensor, by controlling an angular position of at least one of the deformable mirror and the steering mirror.

24. The system of claim 23, further comprising a target illuminator adapted to direct a target illuminator beam toward a target, wherein a target illuminator beam return is generated by scatter of the target illuminator beam off the target and is received through the output aperture.

25. The system of claim 24, wherein the target illuminator beam and the laser beam have different wavelengths.

26. The system of claim 24, further comprising a dispersive element adapted to image each of the laser beam return and the target illuminator beam return onto separate areas of the sensor.

27. The system of claim 20, further comprising scatter control elements disposed along the optical path.

28. The system of claim 20, wherein the output aperture comprises a quarter wave plate.

29. A method of controlling a laser beam, the method comprising:
directing the laser beam out through an output aperture toward a target using a steering mirror;
detecting a laser beam return received through the output aperture, the laser beam return including scatter from the laser beam, the scatter resulting from the laser beam passing through a medium between the output aperture and the target, including detecting relative positions on a sensor of the laser beam return and a target illuminator beam return resulting from scatter of a target illuminator beam off the target;
adjusting the steering mirror in response to the scatter from the laser beam in the detected laser beam return.

30. The method of claim 29, wherein adjusting the steering mirror includes adjusting an angular position of the steering mirror in response to the detected relative positions on the sensor.

31. A method of controlling a laser beam, the method comprising:
- directing the laser beam out through an output aperture toward a target using a steering mirror;
- detecting a laser beam return received through the output aperture, the laser beam return including scatter from the laser beam, including differentiating between a first scatter resulting from the laser beam incident upon the target and a second scatter resulting from the laser beam passing through a medium between the output aperture and the target;
- adjusting the steering mirror in response to the scatter from the laser beam in the detected laser beam return.

32. The method of claim 31, wherein differentiating between the first scatter and the second scatter includes analyzing a signal generated by the scatter using speckle statistics.

33. The method of claim 31, further comprising measuring an angular bias present in the second scatter.

34. The method of claim 33, wherein measuring the angular bias includes comparing a first signal part generated by the first scatter with a second signal part generated by the second scatter.

35. The method of claim 33, wherein adjusting the steering mirror includes adjusting an angular position of the steering mirror in response to the measured angular bias.

36. A method of controlling a laser beam, the method comprising:
- directing the laser beam out through an output aperture toward a target using a deformable mirror;
- detecting a laser beam return received through the output aperture, the laser beam return including scatter from the laser beam, the scatter resulting from the laser beam passing through a medium between the output aperture and the target;
- adjusting the deformable mirror in response to the scatter from the laser beam in the detected laser beam return.

37. The method of claim 36, detecting the scatter includes detecting a wavefront of the scatter.

38. The method of claim 37, wherein adjusting the deformable mirror includes adjusting the deformable mirror in response to the detected wavefront.

39. A method of controlling a laser beam, the method comprising:
- directing the laser beam out through an output aperture toward a target using a deformable mirror;
- detecting a laser beam return received through the output aperture, the laser beam return including scatter from the laser beam, including differentiating between a first scatter resulting from the laser beam incident upon the target and a second scatter resulting from the laser beam passing through a medium between the output aperture and the target;
- adjusting the deformable mirror in response to the scatter from the laser beam in the detected laser beam return.

40. The method of claim 39, wherein detecting the laser beam return includes detecting a first wavefront of the first scatter and detecting a second wavefront of the second scatter.

41. The method of claim 40, wherein adjusting the deformable mirror includes adjusting the deformable mirror in response to a comparison of the first wavefront with the second wavefront.

42. The method of claim 39, wherein differentiating between the first scatter and the second scatter includes analyzing the a signal generated by the scatter using speckle statistics.

43. The method of claim 39, further comprising measuring an angular bias present in the second scatter.

44. The method of claim 43, wherein measuring the angular bias includes comparing a first signal generated by the first scatter with a second signal generated by the second scatter.

45. The method of claim 43, wherein adjusting the deformable mirror includes adjusting the deformable mirror in response to the measured angular bias.

* * * * *